United States Patent
Chung et al.

(10) Patent No.: US 6,950,929 B2
(45) Date of Patent: Sep. 27, 2005

(54) LOOP INSTRUCTION PROCESSING USING LOOP BUFFER IN A DATA PROCESSING DEVICE HAVING A COPROCESSOR

(75) Inventors: Seung Jae Chung, Suwon (KR); Yong Chun Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 09/864,973

(22) Filed: May 24, 2001

(65) Prior Publication Data

US 2002/0178350 A1 Nov. 28, 2002

(51) Int. Cl.$^7$ ............................................... G06F 9/40
(52) U.S. Cl. ............................... 712/241; 712/34
(58) Field of Search ........................ 712/34, 35, 233, 712/241; 711/3

(56) References Cited

U.S. PATENT DOCUMENTS

| | | | | |
|---|---|---|---|---|
| 4,715,013 A | * | 12/1987 | MacGregor et al. | 712/203 |
| 4,727,538 A | | 2/1988 | Furchtgott et al. | |
| 4,862,407 A | | 8/1989 | Fette et al. | |
| 4,991,080 A | * | 2/1991 | Emma et al. | 712/206 |
| 5,093,908 A | * | 3/1992 | Beacom et al. | 712/200 |
| 5,579,493 A | * | 11/1996 | Kiuchi et al. | 712/207 |
| 5,634,047 A | * | 5/1997 | Getzlaff et al. | 712/241 |
| 5,742,781 A | * | 4/1998 | Bajwa | 712/208 |
| 5,854,934 A | * | 12/1998 | Hsu et al. | 717/161 |
| 5,881,263 A | | 3/1999 | York et al. | |
| 5,920,890 A | * | 7/1999 | Moyer et al. | 711/144 |
| 6,047,367 A | | 4/2000 | Heller, Jr. | |
| 6,052,771 A | | 4/2000 | Heller, Jr. et al. | |
| 6,085,315 A | * | 7/2000 | Fleck et al. | 712/241 |
| 6,100,906 A | | 8/2000 | Asaro et al. | |
| 6,124,868 A | | 9/2000 | Asaro et al. | |
| 6,125,440 A | * | 9/2000 | Osovets | 712/205 |
| 6,269,440 B1 | * | 7/2001 | Fernando et al. | 712/241 |
| 6,427,203 B1 | * | 7/2002 | Le Cornec | 712/35 |
| 6,532,530 B1 | * | 3/2003 | Kim et al. | 712/35 |
| 6,598,155 B1 | * | 7/2003 | Ganapathy et al. | 712/241 |
| 2002/0156994 A1 | * | 10/2002 | Agarwal et al. | 712/35 |

FOREIGN PATENT DOCUMENTS

| | | |
|---|---|---|
| EP | 0511484 A1 | 4/1992 |
| EP | 0992894 | 12/2000 |
| EP | 0992894 A1 | 12/2000 |
| JP | 10232775 | 3/1987 |
| KR | 2000-48532 | 7/2000 |

* cited by examiner

*Primary Examiner*—Eddie Chan
*Assistant Examiner*—David J. Huisman
(74) *Attorney, Agent, or Firm*—F. Chau & Associates, LLC

(57) ABSTRACT

A data processing device having a central processing unit for fetching instructions from a program memory, decoding the instructions and sending a signal to a coprocessor if a coprocessor-type instruction is decoded; a coprocessor for decoding the coprocessor-type instructions upon receipt of the signal; and a loop buffer for receiving from the program memory instructions within a loop and storing the instructions within the loop when the coprocessor decodes a loop operation from the coprocessor-type instructions, wherein the instructions within the loop are retrieved from the loop buffer for execution in a subsequent iteration of the loop, and wherein a disable signal is sent to the program memory for inhibiting access of the program memory while the instructions within the loop are retrieved from the loop buffer.

23 Claims, 4 Drawing Sheets

Fig. 4

| Inst Cycle | Loop Ptr | PA | LBR[8:0] | PD | Buffer Fill | Branch Force | Nested Loop |
|---|---|---|---|---|---|---|---|
| 1 | 2 | 102 | 000000000 | PM | | | |
| 2 | 3 | 103 | 000000100 | PM | Fi | | |
| 3 | 4 | 104 | 000001100 | PM | Fi | | |
| 4 | 5 | 105 | 000011100 | PM | Fi | branch #dist1 | nest1 |
| 5 | 4 | 104 | 000011100 | LB | Fi | | |
| 6 | 5 | 105 | 000111100 | LB | | branch #dist1 | nest1 |
| 7 | 6 | 106 | 000111100 | PM | Fi | | |
| 8 | 7 | 107 | 001111100 | PM | Fi | branch #dist2 | |
| 9 | 8 | 108 | 011111100 | PM | Fi | | Long Loop |
| 10 | 2 | 102 | 111111100 | LB | | | |
| 11 | 3 | 103 | 111111100 | LB | | | |
| 12 | 4 | 104 | 111111100 | LB | | branch #dist1 | |
| 13 | 5 | 105 | 111111100 | LB | | | |
| 14 | 4 | 104 | 111111100 | LB | | branch #dist1 | |
| 15 | 5 | 105 | 111111100 | LB | | | |
| 16 | 6 | 106 | 111111100 | LB | | branch #dist2 | |
| 17 | 7 | 107 | 111111100 | LB | | | |
| 18 | 8 | 108 | 111111100 | LB | | | |
| 19 | 9 | 109 | 000000000 | PM | | | |
| 20 | 10 | 110 | 000000000 | PM | | | | ure
LOOP INSTRUCTION PROCESSING USING LOOP BUFFER IN A DATA PROCESSING DEVICE HAVING A COPROCESSOR

BACKGROUND OF THE INVENTION

1. Technical Field

The present invention relates to processing of loop instructions in a data processing device, specifically processing loop instructions using a loop buffer in a data processing device having a CPU and a coprocessor.

2. Discussion of Related Art

In a conventional data processing device having a CPU and a coprocessor, the CPU fetches instructions stored in main program memory for execution by the CPU and/or the coprocessor. Coprocessor instructions are decoded by the CPU and if the decode indicates a coprocessor operation, the CPU signals to the coprocessor to decode the coprocessor instruction for execution. Coprocessors are often used for digital signal processing (DSP) wherein arithmetic calculations (e.g., multiplying, accumulating, dividing, etc.) are frequently encountered. Although dedicated circuits such as multipliers, dividers, or accumulators can be used to perform arithmetic calculations, software arithmetic routines are preferred for various reasons including less space requirements and costs. CPUs can process the arithmetic software routines, but coprocessors are often employed to more efficiently handle the arithmetic routines. Typically, arithmetic routines include many repeated data shifting and thus looping operations. Instructions within a loop routine are fetched by the CPU from the program memory for execution and the same instructions are fetched and executed in subsequent iterations, e.g., a block of instructions for performing a division is looped or reiterated several times for successive division operations. When a data processing device having a CPU and a coprocessor encounters numerous loop operations, the performance of the data processing device is degraded in terms of speed because of increased overhead on the CPU to process the branch, interrupt, or exception instructions. For example, the CPU or the coprocessor must keep track of where the processing routine is before a branch so that the routine can continue upon return from the branch. A separate stack pointer is commonly used by the CPU to handle the execution routines. Further, more power is consumed because of the frequent access of instructions from the main program memory.

A need therefore exists for a data processing device having a CPU and a coprocessor for effectively handling loop operations while reducing CPU overhead and power consumption of the processing device.

SUMMARY OF THE INVENTION

A method of processing loop instructions using a data processing device having a central processing unit (CPU) and a coprocessor is provided, wherein the CPU fetches and decodes instructions retrieved from program memory and determines whether the instructions are CPU-type or coprocessor-type, comprising the steps of: decoding the coprocessor instructions by the coprocessor and if a loop operation is decoded, retrieving from the program memory the instructions within the loop; storing the retrieved instructions within the loop in a loop buffer; and inhibiting instruction fetch from the program memory while instructions within the loop are executed in a subsequent iteration of the loop. Preferably, the method includes the step of accessing the instructions within the loop from the loop buffer in a subsequent iteration of the loop, and the step of decoding further includes determining a backward branch distance for use by the CPU to control branching to and from the loop.

According to an aspect of the invention, the coprocessor determines from the loop instruction a number of iterations of the loop operation, decrements the number of iterations upon completion of each loop; and signals to the CPU the completion of the loop operation when reaching the end of the number of iterations.

According to a preferred embodiment of the present invention, the storing step of the method includes storing 'n' loop instructions in 'm' registers of the loop buffer and addressing the 'm' registers by $\log_2 m$ least significant bits (LSBs) of a program counter, which is also used for addressing the program memory, wherein n or m is any natural number and n is less than or equal to m. Further, accessing of the instructions stored in the loop buffer are through a multiplexer and the multiplexer output is controlled by the $\log_2 m$ LSBs of the program counter. A first instruction within the loop may be stored in any of the m registers addressed by the LSBs of the program counter.

The method preferably further including the steps of signaling the presence or absence of an active loop instruction by a loop buffer flag in each of the 'm' registers in the loop buffer, the presence of an active instruction in a register is indicated by a preassigned signal in the loop buffer flag.

The method further includes the step of inhibiting instruction fetch from the program memory when the preassigned signal in the loop buffer flag is read and indicates the presence of an active loop instruction.

A data processing device is also provided which comprises: a central processing unit (CPU) for fetching instructions from a program memory, decoding the instructions and sending a signal (CCLK) to a coprocessor if a coprocessor type instruction is decoded; a coprocessor for decoding the coprocessor-type instructions upon receipt of the signal (CCLK); and a loop buffer for receiving from the program memory instructions within a loop and storing the instructions within the loop when the coprocessor decodes a loop operation from the coprocessor-type instructions, wherein the instructions within the loop are retrieved from the loop buffer for execution in a subsequent iteration of the loop, and wherein a disable signal is sent to the program memory for inhibiting access of the program memory while the instructions within the loop are retrieved from the loop buffer.

The loop buffer preferably includes 'm' registers, each having a corresponding loop buffer flag for indicating whether the corresponding register is filled with an instruction, wherein the loop buffer flags are accessed by $\log_2 m$ LSBs of a program counter used for addressing the program memory, and a program memory inhibit signal is generated based on a signal read from the loop buffer flag. The loop buffer preferably includes 'm' registers and the registers are addressed by $\log_2 m$ LSBs of a program counter used for addressing the program memory.

According to a preferred embodiment of the present invention, the coprocessor decodes from a loop instruction a loop block size and a number of iterations of looping, and calculates a backward branch distance for use by the CPU to control branching to and from the loop, wherein the backward branch distance is preferably the loop block size minus one.

BRIEF DESCRIPTION OF THE DRAWINGS

FIG. 4 shows a representative flow of loop instructions of the loop buffer of FIG. 1 according to a preferred embodiment of the present invention.

DETAILED DESCRIPTION OF PREFERRED EMBODIMENTS

Figure 1:
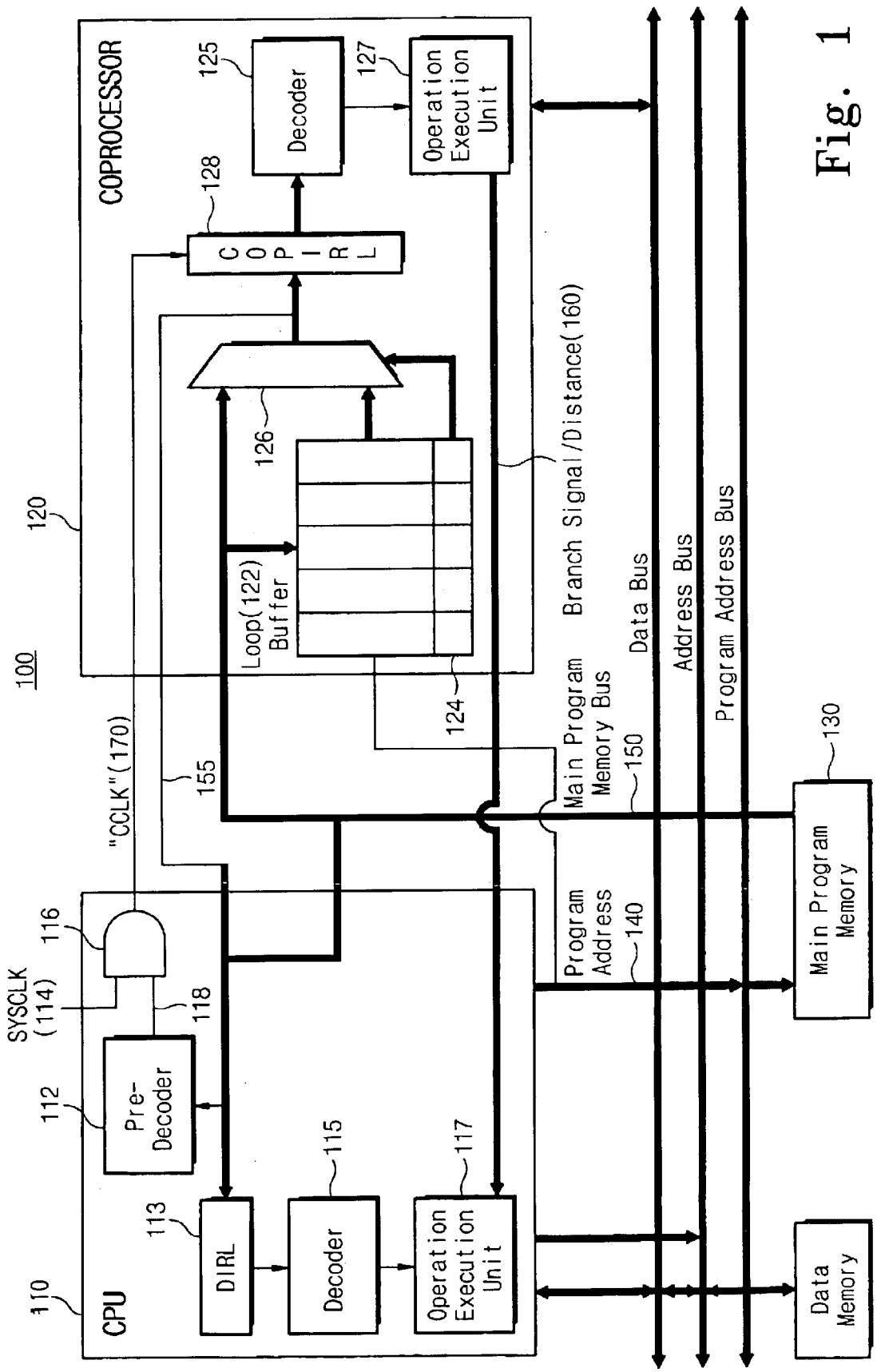
FIG. 1 is a block diagram of a data processing device having a CPU, coprocessor, and a loop buffer according to the present invention.

FIG. 1 shows a block diagram of a data processing device according to a preferred embodiment of the present invention. The data processing device 100 includes a central processing unit (CPU) 110 and a coprocessor 120 for executing CPU and coprocessor type instructions fetched from main program memory 130. CPU 110 fetches instructions by providing program address 140 to main program memory 130 to output the instructions stored in the addressed locations from main program memory 130. The fetched instruction is preferably predecoded by predecoder 112 for the presence of a coprocessor instruction. The fetched instruction is latched in instruction register latch 113 and decoded by decoder 115 of CPU 110, and if it is a CPU-type instruction, it is executed by operation execution unit 117 in CPU 110. If the predecoder 112 decodes a fetched instruction as a coprocessor-type instruction, predecoder 112 outputs an active signal (COPI) at line 118 to so indicate. The COPI signal is synchronized with the system clock (SYSCLK) 114 by an AND gate 116 to output a (CCLK) clock signal 170. The CCLK 170 signal is used to clock in the fetched instruction into a coprocessor instruction register latch (COPIRL) 128. Decoder 125 of coprocessor 120 decodes the instruction and the coprocessor type instruction is executed by operation execution unit 127 of coprocessor 120.

For purposes of illustrating the advantages of the present invention, the Harvard pipelining architecture, which is a four stage pipeline structure of fetch, decode 1, decode 2, and execute/memory, is employed by the data processing device 100. The pipeline structure uses latches which respond to two phases (phase 1, phase 2 ø within one cycle of a system clock). A first latch responds to phase 1 and a second latch responds to phase 2 of the system clock. Memory access and instructions fed from program memory occur concurrently in the same clock cycle.

According to a preferred embodiment of the present invention, a loop buffer 122 is used to enhance the performance of the data processing device 100. According to the present preferred embodiment, the loop buffer 122 is used to store instructions fetched from main program memory which are within loop routines for more efficient accessing and processing by the CPU 110 and/or coprocessor 120. Advantageously, the use of a loop buffer relieves the data processing device 100 from having to access the main program memory 130 when subsequent iterations of the loop routines are executed. Since arithmetic calculations and processing of DSP type instructions frequently involve loop routines, the frequency of use of the loop buffer in place of access from main program memory 130 can be substantial. Since instruction fetch from main program memory are power consuming operations, the device and process according to the present invention reduces the overall power consumption of the data processing device 100. The loop buffer 122 architecture and operation will be described in further detail below with reference to FIG. 3.

Figure 2:
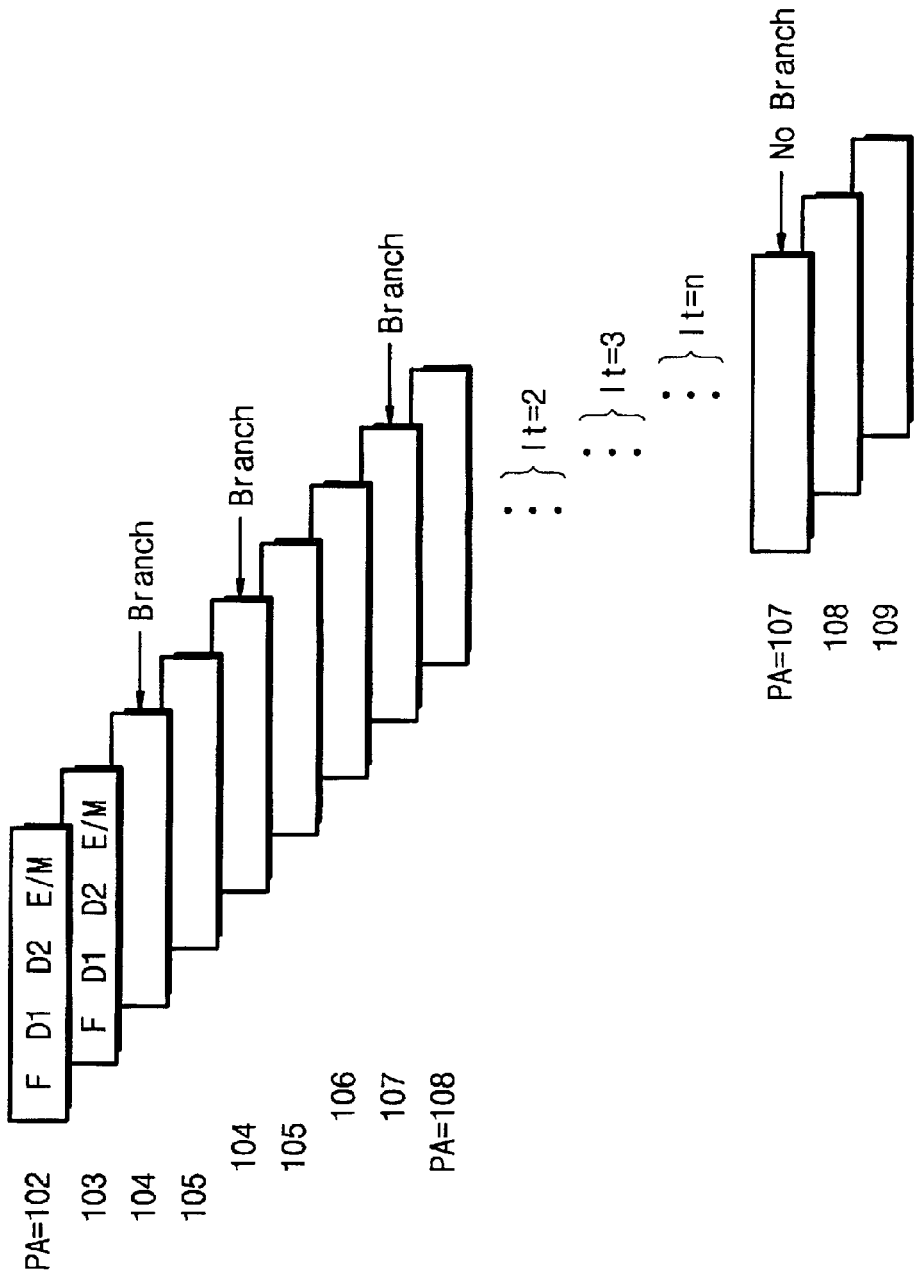
FIG. 2 illustrates the pipeline operation and loop iterations of the data processor of FIG. 1.

Referring to FIG. 2, which shows an exemplary pipelining of loop routines according to a preferred embodiment of the present invention. The exemplary routine includes a nested loop at program address 104 and 105 and a long loop from program address 102 to program address 108. Upon the first detect of a loop instruction by decoder 125 of coprocessor 120 (FIG. 1), instructions within the loop are stored in loop buffer 122. The loop block size and the number of iterations of loops are also detected by the coprocessor. Coprocessor calculates the loop block size and the timing to issue backward branch instructions to signal the CPU to branch to and from the loop routine. According to a preferred embodiment of the present invention, the backward branch distance is calculated to be loop block size minus one. It can be seen from FIG. 2 that branch instructions are issued from a coprocessor at an instruction prior to the appearance of the last instruction of the loop. For example, if the loop block size is two (for PA=104 and PA=105), the backward branch is issued at (2minus 1) or the first instruction of the loop. For the loop from PA=102 to PA=108, the backward branch is issued at (9−1=8) the eighth instruction within the loop at PA=107. CPU 110 carries out the branch operation in response to the branch signal from the coprocessor 120. When a specified number 'n' iterations of the loop have been executed, a branch instruction is not issued, allowing the routine to proceed outside of the loop, to PA=109.

Figure 3:
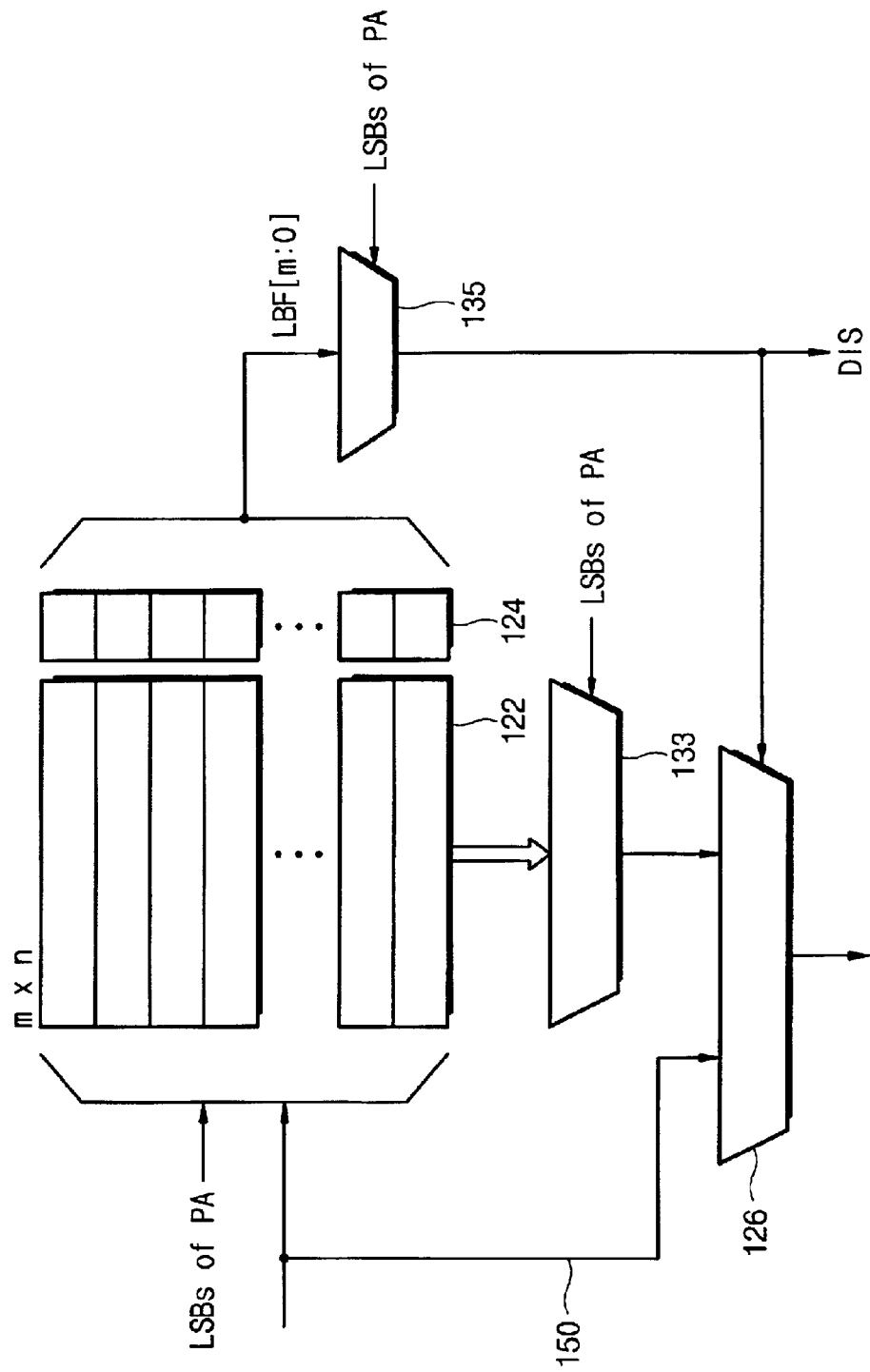
FIG. 3 shows a block diagram of the loop buffer.

FIG. 3 shows the structure and architecture of a loop buffer for use in a data processing device according to the present invention. Loop buffer 122 comprises "M" buffers (M being any natural number), each having a corresponding loop buffer flag for indicating the presence or absence of an active instruction stored in a corresponding latch register of the loop buffer 122. Loop buffer 122 is of a sufficient size in length to hold the largest block of instructions within a loop routine and the buffers are sufficiently wide to hold at least the full width of an instruction. In the present embodiment, the buffer width is preferably 32 bits, the number of buffers M is preferably 12 and the loop buffer flag (LBF) is preferably one bit each. Upon detection of a loop routine by a decoder in the data processing device, which in the present embodiment, the decoding is by decoder 125 of coprocessor 120, the instructions within the loop routine are read from the main program memory 130 and stored, preferably sequentially, in the coprocessor 120 in the latches of loop buffer 122. According to a preferred aspect of the present invention, the access to and from the loop buffer including the loop buffer flag are controlled from $\log_2$ M least significant bits (LSBs) of the program address 140. For example, if M is equal to 16, 4 ($\log_2 16$ equal to 4) LSBs of the program address 140 are used to write and read into and out of the loop buffer 122 and loop buffer flags 124. According to this embodiment of the invention, the four LSBs of program address 140 are used to address the M=16 latches of loop buffer 122 and the corresponding 16 bits of LBF 124. When a loop routine is detected, the first instruction within the loop routine will be loaded from the main program memory 130 into the latch of the loop buffer 122 addressed by the four LSBs of program address 140. Upon storing an instruction in the latch addressed by the four LSBs of program address, the corresponding LBF is written with a preassigned signal to indicate the presence or absence of an instruction. According to the present embodiment, the setting of the flag with a logic high ('1') signals an active instruction in the corresponding latch of loop buffer 122. As the subsequent instructions within the loop are read from main program memory 130, they are loaded in the latches of loop buffer 120, preferably sequentially, as they are read out of main program memory 130 addressed by the four LSBs of program address 140.

When coprocessor 120 decodes a loop routine, the coprocessor also reads from the instructions the pertinent data needed for managing the loop operation. The data includes the block size of the loop routine and the number of iterations of the loop. The coprocessor 120 monitors the number of instructions within a loop routine to be executed by calculating the distance of travel (in clock cycles) of a particular loop. According to this embodiment, distance is the loop block size minus one. For example, if the loop block size is 9, the loop distance before a backward branch signal is generated is 9 minus 1 or 8 pipelines. Coprocessor 120 also monitors the number of iterations of the loop routines. Upon the first occurrence of a loop routine, the instructions are read from main program memory 130 and instructions within the loop are stored in latches of loop buffer 122 so that the instructions within the loop are executed and read from loop buffer 122 in the next iteration of the loop routine, relieving the data processing device from having to access the main program memory 130. Coprocessor 120 decrements the count of the number of iteration of the same loop by one and this is repeated until the number of iterations is counted down to zero, whereupon the loop routine is completed and coprocessor 120 signals to CPU 110 that the loop is completed. In the present preferred embodiment, a branch instruction is not generated at an instruction prior to the end of the loop routine (PA=107 of FIG. 2), and the routine continues to the next instruction outside of the loop routine (PA=109 of FIG. 2). Advantageously, because the $\log_2 M$ bits of program address 140 is used for writing and reading the loop buffer 122, there is no need for the coprocessor to separately monitor the program address count or to use any stack pointers for keeping track of where the program address was before the loop routine.

Referring again to FIG. 3, the latches of loop buffer 122 are shown to be addressed by the LSBs of program address 140 for writing the instructions of the loop routine fetched from main program memory 130. In the next iteration of the same loop routine, the instructions are read out of loop buffer 122, the reading of the instructions from the latches of loop buffer 122 are through a 'm to 1' multiplexer 133, with the select port addressed by the 4 LSBs of program address 140. The LBF registers are also read through a multiplexer 135 with the same four LSBs of program address 140 used as select signals. Thus, when a LBF register signal is read as active, or according to this preferred embodiment a logic high, signaling an active instruction within a loop being read from loop buffer 122, the active signal is used to select multiplexer 126, which multiplexes between the instruction read from either loop buffer 122 or main program memory 130. With an active LBF register signal, multiplexer 126 outputs the instruction read from loop buffer 122. While the instruction is being read, the active signal of the LBF register is also used to disable access of main program memory 130 by outputting an active DIS signal from multiplexer 135. The DIS signal is used to inhibit instruction fetch from the main program memory. For example, the DIS signal is connected to the memory select signal (CAS) to disable access from the main program memory 130. Advantageously, the configuration of the loop buffer, the LBF registers, and the multiplexers of FIGS. 1 and 3 reduces access of instructions from main program memory 130 when instructions are executed from loop buffer 122. The loop instruction output from loop buffer 122 through MUX 126 can be either a coprocessor-type instruction for execution by coprocessor 120 or the instruction can be a CPU-type instruction executed by CPU 110. If the instruction is a CPU-type instruction, the instruction output from multiplexer 126 is forwarded to CPU 110 via bus 155. If the instruction retrieved from loop buffer 122 is a coprocessor type instruction, the output of multiplexer 126 is latched into coprocessor instruction register latch 128, decoded by decoder 125 and executed by operation execution unit 127 of coprocessor 120.

According to a preferred embodiment of the present invention, the execution of a loop routine with use of a loop buffer can be overridden by the CPU in special circumstances. The CPU 110 can override the loop buffer operation by controlling the loop buffer flags, for example, by clearing active signals in the flags.

FIG. 4 is a table listing for illustrating an execution of an exemplary routine having loop operations using a loop buffer according to a preferred embodiment of the present invention. In this example, a loop routine is encountered at program address 102. Since the LSBs of the program counter is used as the loop pointer, the loop pointer points at loop buffer latch number two (loop pointer=2). At the first instruction cycle of the loop routine, program address (PA) is at 102 and the loop routine is detected and decoded by coprocessor 120. Upon execution of this instruction, which is fetched from main program memory 130, the program data is stored in address 2 of loop buffer 122. During the next instruction access from program memory 130, at program address 103 and loop pointer 3, the LBF register bit 2 is set to indicate that an instruction has been loaded in address 2 of loop buffer 122. During this pipeline, the instruction just fetched from program memory 130 is loaded into location 3 of loop buffer 122. At program address 104, coprocessor 120 detects a nested loop which has a loop block size of 2. Coprocessor 120 thus calculates the backward branch distance of 2−1=1 and signals a branch instruction in this pipeline. Meanwhile, the instruction fetched from program address 104 is stored at the fourth location of loop buffer 122, and the previous addressed LBF register at location 3 is set to indicate that an active loop instruction has been stored at location 3 of loop buffer 122. At program address 105, the instruction is fetched from program memory 130, CPU 110 is alerted to a branch signal by coprocessor 120 and prepares branching of the instruction to the nested loop which begins at program address 104. During the pipeline of program address 105, the instruction fetched from program memory 130 is stored in the fifth location of loop buffer 122 and LBF register number 4 is set to indicate that the fourth location had been stored with the previous loop instruction.

The next instruction is the first occurrence of the nested first iteration of the nested loop which begins at 104, and the program instruction is read from the fourth and fifth locations of loop buffer 122 for execution. Upon the end of the execution of nested loop at instruction cycle 6, coprocessor 120 signals the end of loop or no branch. CPU 110 does not cause a branch and the program address is incremented to the next address which is 106. At this time, loop buffer 122 still has active loop instructions at locations 2, 3, 4 and 5 as indicated by an active signal, or a logic 1 at respective bit positions of LBF [8:0]. The pipeline of program address 106 returns fetching of instructions of program memory 130 and filling of loop buffer of an instruction at location 6 of the loop buffer. According to the present preferred embodiment of the invention, coprocessor 120 has retrieved the information needed to monitor the beginning and the approach of the end of loop routines, e.g., by calculating the backward branch distance and monitoring the number of iterations of loops. Thus, at program address equals 108, coprocessor 120 recognizes that this is the end of the loop routine which began at program address 102. During this pipeline, loop buffer latches 7 and 8 are filled with instructions fetched from program memory 130 and locations 2 to 8 have now been loaded with the instructions within the loop (from PA 102 to PA 108). The next instruction branches back to PA 102 to begin the next iteration of the loop. The loop pointer is at 2, and all instructions within the loop will be fetched from loop buffer 122 and the entire loop including the nested loop at PA 104/105 is repeated. It can be seen that during the execution of the loop from PA=102 to PA=108 in this iteration, there is no need to access main program memory 130. Prior to the last pipeline of the loop routine, a branch signal is generated by coprocessor 120 at instruction 17. CPU 110 prepares branching out of the loop routine and advances PA from 108 to 109, the beginning of a fetch instruction outside of the loop routine. At PA 109, the LPF registers are cleared and instructions are fetched from program memory 130. PA 109 and PA 110 have instructions which are not decoded as loop instructions.

One ordinarily skilled in the art can readily appreciate that the specific architecture and implementation of the loop buffer and program memory control as described above can be varied without departing from the scope of the present invention. For example, loop buffer 122 can be integrated on coprocessor 120, or on a common integrated circuit chip, or can be placed external to either coprocessor 120 or CPU 110. The generation of branch addresses and the monitoring of the number of iterations are performed according to the present embodiment by coprocessor 120. These functions can also be performed by a memory controller (not shown). It can also be seen that the architecture of the embodiment of the invention shown in FIG. 1 facilitates execution of instructions stored in the loop buffer which are either coprocessor type or CPU type instructions. Accordingly, the invention is not limited to the precise embodiments described herein and the gist, scope, and spirit of the invention is defined by the appended claims.

What is claimed is:

1. A method of processing loop instructions using a data processing device having a central processing unit (CPU) and a coprocessor, wherein the CPU fetches and predecodes instructions retrieved from program memory and determines whether the instructions are CPU-type or coprocessor-type, comprising the steps of:

decoding the coprocessor-type instructions by the coprocessor and if a loop operation is decoded, retrieving from the program memory the instructions within the loop;

storing the retrieved instructions within the loop in a loop buffer:

executing at least one coprocessor-type instruction from the loop buffer by the coprocessor, and forwarding any CPU-type instructions from the loop buffer to the CPU for execution; and inhibiting instruction fetch from the program memory while instructions within the loop are executed in a subsequent iteration of the loop.

2. The method of claim 1, further including the step of accessing the instructions within the loop from the loop buffer in a subsequent iteration of the loop.

3. The method of claim 1, further including determining a backward branch distance for use by the CPU to control branching to and from the loop.

4. The method of claim 1 further including the steps of:

determining from the loop instruction a number of iterations of the loop operation;

decrementing by the coprocessor the number of iterations upon completion of each loop; and signaling to the CPU the completion of the loop operation when reaching the end of the number of iterations.

5. The method of claim 1, wherein said storing step includes storing 'n' loop instructions in 'm' registers of the loop buffer and addressing the 'm' registers by $\log_2 m$ in least significant bits (LSBs) of a program counter which is also used for addressing the program memory, wherein n or m is any natural number and n is less than or equal to m.

6. The method of claim 5, further including the steps of accessing the instructions stored in the loop buffer through a multiplexer and controlling the multiplexer output by the $\log_2 m$ LSBs of the program counter.

7. The method of claim 5, wherein a first instruction within the loop is stored in one of the m registers addressed by the LSBs of the program counter.

8. The method of claim 1, further including the steps of signaling the presence or absence of an active loop instruction by a loop buffer flag in each of the 'm' registers in the loop buffer, the presence of an active instruction in a register is indicated by a preassigned signal in the loop buffer flag.

9. The method of claim 8, further including the step of accessing each flag in the loop buffer by $\log_2 m$ least significant bits of a program counter used for addressing the program memory.

10. The method of claim 8, further including the step of multiplexing an instruction from the loop buffer and the program memory, the multiplexing is dependent upon a presence of an active instruction signal from a loop buffer flag.

11. The method of claim 8, wherein said step of inhibiting instruction fetch from the program memory includes sending an inhibit signal to the program memory when the preassigned signal in the loop buffer flag is read and indicates the presence of an active loop instruction.

12. The method of claim 11, wherein the preassigned signal in each of said loop buffers is selectively alterable by the CPU independent of the presence or absence of an active instruction in corresponding registers.

13. The method of claim 8, further including the step of clearing the loop buffer flag when the loop operation is completed.

14. A data processing device comprising:

a central processing unit (CPU) for fetching instructions from a program memory, predecoding the instructions and sending a signal (CCLK) to a coprocessor if a coprocessor-type instruction is decoded;

a coprocessor for decoding the coprocessor-type instructions upon receipt of the signal (CCLK); and a loop buffer for receiving from the program memory instructions within a loop and storing the instructions within the loop when the coprocessor decodes a loop operation from the coprocessor-type instructions, wherein the instructions within the loop are retrieved from the loop buffer for execution in a subsequent iteration of the loop, and wherein the loop buffer instructions of coprocessor-type are executed by the coprocessor and the loop buffer instructions of CPU-type are forwarded to the CPU for execution.

15. The device of claim 14, wherein a disable signal is sent to the program memory for inhibiting access of the program memory while the instructions within the loop are retrieved from the loop buffer.

16. The device of claim 14, wherein the loop buffer includes 'm' registers, each having a corresponding loop buffer flag for indicating whether the corresponding register is filled with an instruction.

17. The device of claim 16, wherein the loop buffer flags are accessed by $\log_2 m$ least significant bits of a program counter used for addressing the program memory.

18. The device of claim 16, wherein a program memory inhibit signal is generated based on a signal read from the loop buffer flag.

19. The device of claim 14, wherein the loop buffer includes 'm' registers and the registers are addressed by $\log_2 m$ LSBs of a program counter used for addressing the program memory.

20. The device of claim 16, further including a multiplexer for multiplexing between the instructions retrieved from the program memory and the instructions retrieved from the loop buffer, the multiplexor being controlled by signals read from the loop buffer flags.

21. The device of claim 14, wherein the coprocessor decodes from a loop instruction a loop block size and a number of iterations of looping, and calculates a backward branch distance for use by the CPU to control branching to and from the loop.

22. The device of claim 21, wherein the backward branch distance is the loop block size minus one.

23. A data processing device comprising:
a central processing unit (CPU) for fetching instructions from a program memory, predecoding the instructions and sending a signal (CCLK) to a coprocessor if a coprocessor-type instruction is decoded;
a coprocessor for decoding the coprocessor-type instructions upon receipt of the signal (CCLK); and
a loop buffer for receiving from the program memory instructions within a loop and storing the instructions within the loop when the coprocessor decodes a loop operation from the coprocessor-type instructions, wherein the instructions within the loop are retrieved from the loop buffer for execution in a subsequent iteration of the loop, wherein the loop buffer instructions of coprocessor-type are executed by the coprocessor and the loop buffer instructions of CPU-type are forwarded to the CPU for execution, and wherein a disable signal is sent to the program memory for inhibiting access of the program memory while the instructions within the loop are retrieved from the loop buffer.

* * * * *